Nov. 26, 1968     M. T. MARRERO     3,413,402
RADAR LANDMASS SIMULATOR
Filed May 25, 1967     3 Sheets-Sheet 1

INVENTOR.
Michael T. Marrero
BY Harvey A. David
ATTORNEYS

Nov. 26, 1968     M. T. MARRERO     3,413,402
RADAR LANDMASS SIMULATOR
Filed May 25, 1967     3 Sheets-Sheet 3

INVENTOR.
Michael T. Marrero
BY Harvey A. David
ATTORNEYS

United States Patent Office 3,413,402
Patented Nov. 26, 1968

3,413,402
RADAR LANDMASS SIMULATOR
Michael T. Marrero, Orlando, Fla., assignor to the United States of America as represented by the Secretary of the Navy
Filed May 25, 1967, Ser. No. 642,669
5 Claims. (Cl. 35—10.4)

ABSTRACT OF THE DISCLOSURE

A system for providing elevation data in a landmass radar simulator and comprising a three shades of gray transparency representative of predetermined increments of elevation change, flying spot scanner means and phototube means for providing voltage signals representative of said gray levels, differentiator means for differentiating said signals with respect to time to provide trigger signals various combinations of which are indicative of up or down increments of elevation change, logic circuit means responsive to the trigger signals to provide a continuous voltage output which is analogous to the elevation represented by the scanned transparency.

---

The invention described herein may be manufactured and used by or for the Government of the United States of America for governmental purposes without the payment of any royalties thereon or therefor.

Background of the invention

Current radar landmass simulators embody a factored transparency technique utilizing two photo-transparency maps (one to store terrain elevation data, the other to store radar reflectivity data). The information is retrieved by using the transparencies to modulate light beams from a flying spot scanner directed into phototubes. This is accomplished by splitting the beam from a flying spot scanner into three beams. Two beams are directed through the transparencies into phototubes, and the third goes directly into a reference phototube and provides a feedback signal to maintain constant brightness of the flying spot.

Data is read from the transparency maps by allowing a discrete amount of the impinging light to pass through at any given point on the map. Each discrete transmission step is referred to as a shade of gray. All the data on the reflectivity transparency is in seven shades of gray. The darker shades represent lower reflectivity areas, with lighter shades simulating higher reflectivity areas. The elevation transparency map utilizes 29 discrete density levels or shades of gray. Each shade represents a given terrain elevation above sea level or other specific reference. The lower light transmission levels (darker shades) are for lower elevations. The elevation increment for each step of gray is determined after an analysis of the specific trainer application and the elevation range of the simulated terrain. Generally, the darker steps represent lower elevation incremental changes than the lighter steps.

Signals obtained from scanning these two transparencies are analog functions depicting terrain elevation and radar reflectivity as a function of time. The simulated radar display is generated from these functions by utilizing an analog shadow computer and suitable processing circuitry to obtain the proper shadowing, brightness enhancement, etc., consistent with aircraft altitude.

The foregoing, current method of radar landmass simulation has several severe limitations, particularly in low altitude simulation. Some of the disadvantages of this system are:

(a) Twenty-nine shades of gray is essentially the state-of-the-art in photo-transparency production. Any increase in noise level due to components or installation will decrease the elevation resolution. As the noise level increases, the resolution loss shows up first at the lower elevations.

(b) The feedback circuit must critically maintain a constant spot brightness. Any degradation in the phototube or circuitry will cause brightness variations greater than the transparency increments.

(c) Each shade of gray in the elevation transparency represents a discrete terrain elevation. A particular shade has to transmit a given percentage of the impinged light to very close tolerance throughout the transparency. Meeting this required transmission tolerance is one of the principal reasons for the high reject rate and long lead time of the master transparency.

(d) With a system limitation of 29 elevation steps, the elevation resolution of any practical terrain must be coarse. For example, a transparency of the eastern half of the United States has an elevation resolution of about 150 feet. If the system is to be used to simulate terrain avoidance radar, the aircraft altitude over the terrain will be less than the resolution of the system.

Summary of the invention

With the foregoing in mind, it is a principal object of this invention to provide means for storing and recovering elevation data in such manner as to alleviate some of the aforementioned current system limitations.

As another object the present invention aims to accomplish the foregoing through the provision of a factored photo-transparency on which is stored terrain incremental elevation data per se. For example, according to this invention if the elevation of the terrain being traversed increases or decreases by one elevation increment, the incremental change is stored on the transparency without regard to the absolute elevation at the place of change. This storage is accomplished according to the invention by utilizing three density or transmission levels (shades of gray) on the transparency instead of the 29 or so currently used. A predetermined change in density levels indicates a change in elevation of one increment, and the order in which the density level changes occur determines the direction of the elevation change. These three densities can be a maximum density, a minimum density, and an average density between the two. Accordingly, the required sensitivity of gray level detection can be substantially reduced as compared to prior systems.

The invention further contemplates, as part of the system, logic circuitry for converting the output of the phototube into a continuous analog signal representative of the elevation as it is scanned or traversed.

Brief description of the drawings

In the accompanying sheets of drawings forming a part of this specification.

Description of the preferred embodiment

Figure 1:
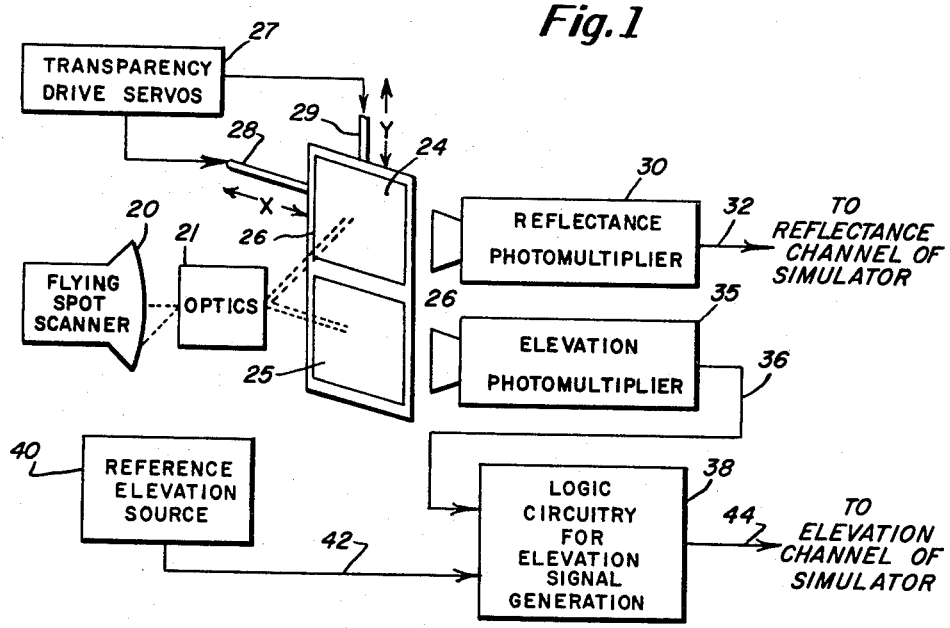
FIG. 1 is a diagrammatic illustration of an elevation data storage and recovery system embodying the invention.

Referring to FIG. 1 wherein a portion of a landmass radar simulator is illustrated, a flying spot scanner 20 is provided as a reliable and readily controlled moving spot light source. The light from the scanner is split and focused by suitable optics 21 to illuminate two factored storage members in the form of transparencies 24 and 25 which are supported by a common frame 26 for movement. The transparency 24 has reflectance data encoded thereon, while the transparency 25 has terrain elevation data encoded thereon in a manner which will be more fully described as the specification proceeds.

The frame 26 holds the transparencies 24, 25 in proper registration and is movable in accordance with $x$ and $y$ output signals of an aircraft position computer (not shown) by suitable transparency drive servos 27 through mechanical coupling means 28, 29 so that the positions of the transparencies correspond to the simulated aircraft position.

A light responsive means such as reflectance photomultiplier 30 is disposed to receive light transmitted through the reflectance transparency 24 and to convert varying light intensities to voltage signals which are transmitted via line 32 to the reflectance channel of a radar simulator for utilization in producing a simulated radar presentation. The reflectance transparency and the particular utilization circuitry and simulator apparatus served by the photomultiplier 30 form no actual part of the present invention, the foregoing brief description being solely to provide a better understanding of the environment in which the invention itself may be used. Suffice it to say further that the radar simulator utilization circuitry or apparatus may be similar to those described in United States Patent No. 3,067,526 to E. E. Gray et al. and in United States Patent No. 3,131,247 to D. A. Benamy et al.

Figure 3:
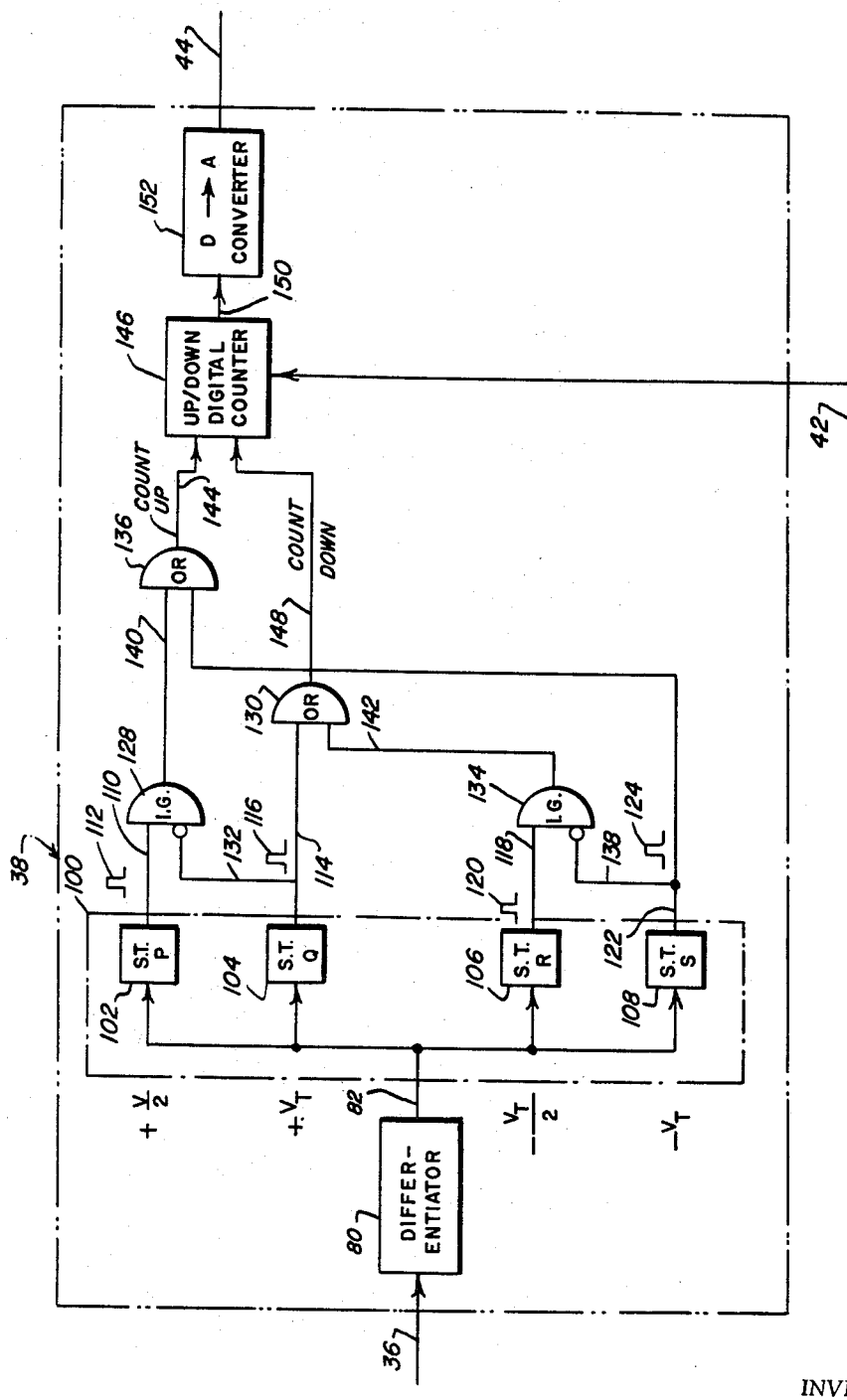
FIG. 3 is a diagrammatic illustration of the logic circuitry portion of the system of FIG. 1.

Another light responsive means such as elevation photomultiplier 35 is disposed to receive light transmitted from the flying spot scanner 20 through the elevation transparency 25 and to convert varying light intensities to voltage signals which are transmitted via line 36 to logic circuitry, generally indicated at 38 in FIG. 1, for elevation signal generation later more fully described with reference to FIG. 3. Suffice it to say for the present that the logic circuit 38 adds or subtracts increments of elevation to a reference elevation which is provided as a pre-set value from an input source 40 to the circuit 38 as shown by flow line 42. The logic circuitry 38 provides elevation voltage signals as an output via line 44 to the elevation channel of radar simulator means such as described in the above mentioned patents.

Figure 2:
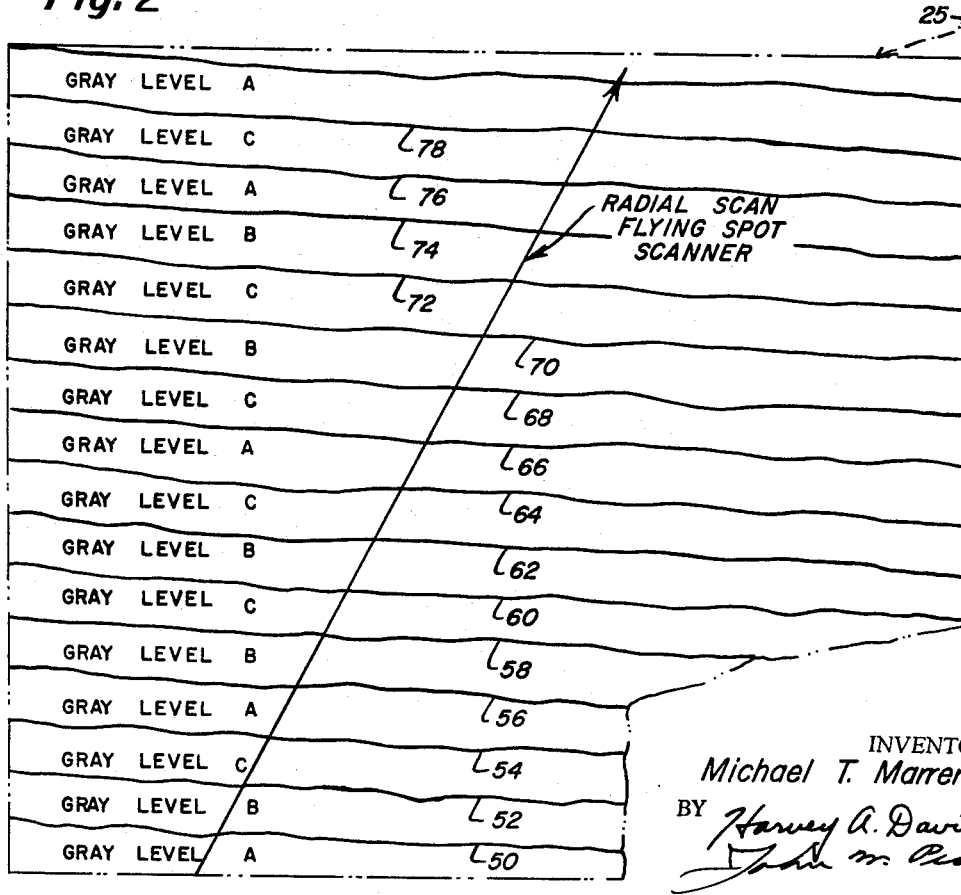
FIG. 2 is an enlarged, fragmentary view of an elevation transparency forming part of the system of FIG. 1.

The varying light intensities transmitted by the transparency 25 to the photomultiplier 35 are effected by encoding on the transparency 25 terrain elevation data in the form of a plurality of gray level areas as shown in FIG. 2. The present invention requires only three gray levels or degrees of light transmission. These are designated as gray level A which is the darkest or least transmitting; gray level B which is lighter; and gray level C which is the lightest or most transmitting. Thus, the transparency 25 is made up of a plurality of gray level areas, each of which is characterized as gray level A, B, or C. The gray level areas on the transparency 25, represent increments of change in elevation of the terrain represented by the transparency. For example, each increment may be 100 feet of elevation change.

The transparency 25 is scanned by a spot of light from the flying spot scanner 20 in a pattern, usually a repeated radial scan of changing azimuth, to simulate scan of actual terrain by a radar antenna. A line of radial scan of the transparency 25 is indicated at 46 in FIG. 2.

Figure 4:
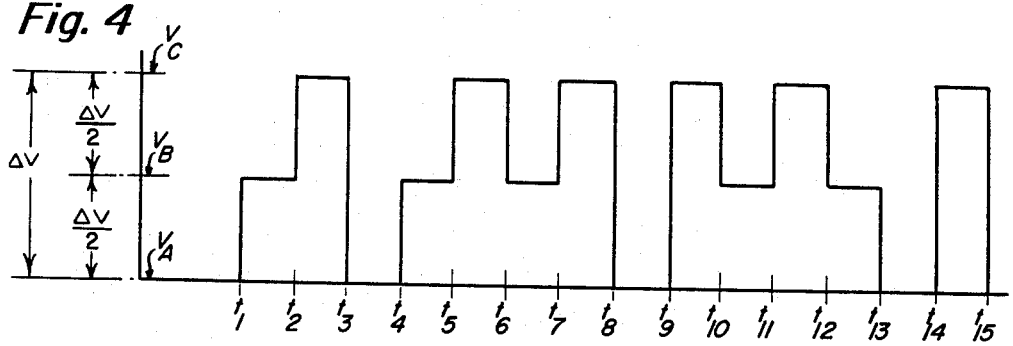
FIG. 4 is a graphic illustration of the output signals of the elevation photomultiplier.

When the scanning spot is travelling upward across the gray level A at the lowermost part of FIG. 2, the voltage output of the elevation photomultiplier 35 on line 36 will be at the level indicated at $V_A$ in FIG. 4. When the scanning spot crosses the boundary 50 to the lighter gray level B at time $t_1$ the voltage output of the photomultiplier 35 will jump to a voltage level $V_B$, and when the spot crosses the boundary 52 to the adjacent gray level C, the photomultiplier output will jump to a voltage level $V_C$. The total change in voltage is indicated as $\Delta V$, while the changes from $V_A$ to $V_B$, and $V_B$ to $V_C$ are each indicated as $\Delta V/2$.

At time $t_3$ when the scanning spot crosses the boundary 54 to the adjacent gray level A, the voltage change is $\Delta V$, and so on as the scanning progresses.

Each crossing of one of the boundaries 50–78 is indicative of a change in elevation of a predetermined increment, e.g. 100 feet. The corresponding change in voltage $\Delta V$ or $\Delta V/2$ which occurs, and the direction of the voltage change, are utilized in a manner which will become apparent as the description proceeds to update the elevation analog output signal on line 44 from the logic circuitry 38 of FIG. 3.

Figure 5:
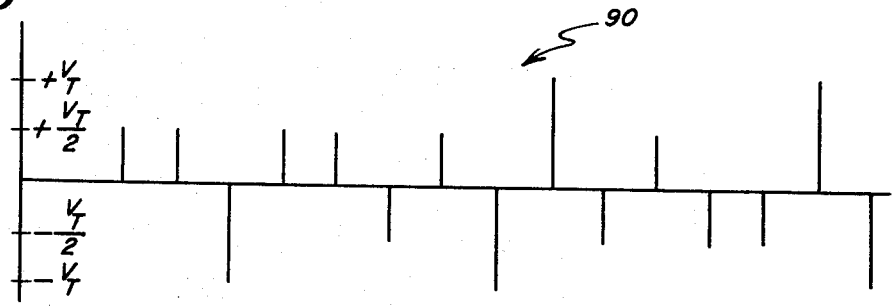
FIG. 5 is a graphic illustration of trigger pulses formed by differentiation of the signals of FIG. 4.

Referring now to that figure, the voltage signals from the photomultiplier are applied as indicated by line 36 to a differentiator 80 of conventional construction which differentiates the voltage signals with respect to time to provide on line 82 a plurality of positive and negative trigger pulses indicated generally at 90 in FIG. 5. It will be observed from FIGS. 4 and 5 that when the scanner spot goes from gray level A to level B as at time $t_1$, or from level B to level C as at time $t_2$, a positive trigger pulse of voltage $+V_T/2$ occurs.

It will also be observed that when the scanner spot goes from gray level C to gray level B as at time $t_6$, or from gray level B to gray level A as at time $t_{13}$, a negative trigger pulse of voltage $-V_T/2$ occurs and, when the scanner spot goes directly from gray level C to gray level A, a negative trigger pulse of voltage $-V_T$ occurs.

Figure 6:
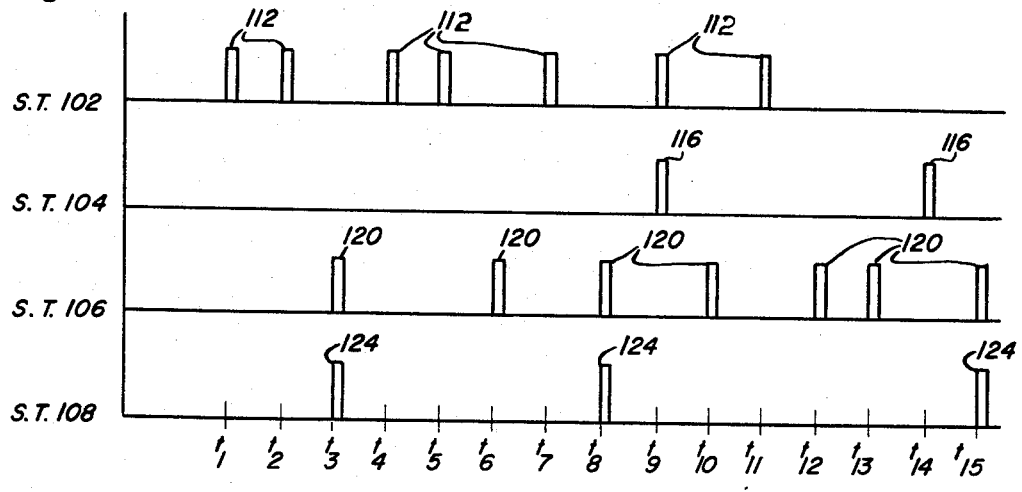
FIG. 6 is a graphic illustration of output signal pulses from a Schmitt trigger bank in response to the trigger pulses of FIG. 5.

These trigger pulses 90 are fed to a Schmitt trigger bank 100 which includes four Schmitt trigger circuits 102, 104, 106, and 108. The Schmitt trigger circuits, hereinafter referred to as S.T. 102, S.T. 104, S.T. 106 and S.T. 108 for convenience, may be of any conventional construction such that: S.T. 102 has a threshold of response which will provide on line 110 an output pulse 112 (FIG. 6) when it receives a positive trigger pulse 90 of voltage $+V_T/2$ or $+V_T$, but will not fire when it receives negative trigger pulses; S.T. 104 has a threshold of response which will provide on line 114 an output pulse 116 only when it receives a positive trigger pulse of voltage $+V_T$; S.T. 106 has a threshold of response which will provide on line 118 an output pulse 120 when it receives a negative trigger pulse of voltage $-V_T/2$ or $-V_T$, but will not fire when it receives positive trigger pulses; and S.T. 108 has a threshold of response which will provide on line 122 an output pulse 124 only when it receives a negative trigger pulse of voltage $-V_T$.

Thus, it can be seen that firing of S.T. 102 can be exclusive of S.T. 104, 106, and 108; firing of S.T. 104 includes firing of S.T. 102; firing of S.T. 106 can be exclusive of S.T. 102, 104 and 108; and, firing of S.T. 108 includes firing of S.T. 106.

Now, S.T. 102 has its output connected by line 110 to the controlled signal input of an inhibition gate 128, while S.T. 104 has its output connected by line 114 to one input of an OR gate 130, and by a line 132 to the controlling signal input of the inhibition gate 128. S.T. 106 has its output connected by line 118 to the controlled signal input of an inhibition gate 134, while S.T. 108 has its output connected by line 122 to one input of an OR gate 136, and by a line 138 to the controlling signal input of the inhibition gate 134. The output of the inhibition gate 128 is connected by a line 140 to provide a second input to the OR gate 136, and the output of the inhibition gate 134 is connected by a line 142 to provide a second input to the OR gate 130.

The output of the OR gate 136 is connected by a line 144 to an up/down counter 146 to provide "count-up" input signals thereto while the output of the OR gate 130 is connected by a line 148 to the up/down counter to provide "count-down" input signals thereto.

When S.T. 102 alone is fired, as at time $t_1$ or $t_2$ by a trigger signal $+V_T/2$, an output pulse 112 is applied on line 110 as an input signal to the inhibition gate 128 which, because of absence of an inhibiting control signal via line 132, passes the signal on line 140 to the OR gate 136. The OR gate 136, in turn, passes a count-up signal on line 144 to the counter 146, thereby adding a count to that held in the counter.

When S.T. 104 is fired, as at time $t_9$ or $t_{14}$ by a trigger signal $+V_T$, an output pulse 116 is applied on line 114 as an input to the OR gate 130 which passes a count-down signal on line 148 to the counter 146, thereby subtracting a count from that held in the counter. At the same time that S.T. 104 is fired, S.T. 102 is also fired. The pulse 116 is, however, applied also via line 132 as an inhibit control signal to the inhibition gate 128 which thereby prevents passage of a pulse 112 from S.T. 102 at that time.

When, as at time $t_6$ or $t_{13}$ a $-V_T/2$, trigger signal fires S.T. 106, a pulse 120 is provided on line 118 to inhibition gate 134. Gate 134 passes the pulse as an input to OR gate 130 which produces a count-down pulse causing the counter 146 to subtract a count from the total count then held.

When, as at time $t_3$ or $t_8$ a trigger signal $-V_T$ fires S.T. 108, a signal pulse 124 is passed as an input to OR gate 136 which provides a count-up signal to the counter 146. At those times when S.T. 108 is fired S.T. 106 is also fired. Accordingly, the pulses 124 from S.T. 108 are applied via line 138 as inhibit control signals to inhibition gate 134 to prevent passage by the latter of the pulses 120 from S.T. 106.

It will be recognized that the foregoing logic circuit will cause a count to be added when a given boundary such as boundary 50 is crossed by the scan in one direction, and will cause a count to be subtracted if the same boundary is passed in the opposite direction. This, of course, is necessary for terrain elevation simulation in apparatus where a simulated aircraft can be made to "fly" in any direction by a trainee.

The up/down counter 146 may conveniently be of the well known binary register type. The counter 146 is preset via line 42 with an initial count corresponding to the simulated elevation at which the scanner spot will start its scan. Thereafter, each count-up and countdown singal will be respectively added to or subtracted from the count algebraically so that at any time the existing count corresponds to the elevation being simulated.

The state of count in the counter 146 is applied as indicated by line 150 as an input to a digital to analog converter 152. The latter may be any one of several known converters so long as it is compatible with the digital counter 146. The converter 152 provides an output voltage signal on line 44 which is analogous to the terrain elevations being simulated. This analog signal, on line 44, is fed to the elevation channel of the simulator in accordance with prior practice as described in aforementioned patents.

Obviously many modifications and variations of the present invention are possible in the light of the above teachings. It is therefore to be understood that within the scope of the appended claims the invention may be practiced otherwise than as specifically described.

What is claimed is:

1. In a radar landmass simulator, an elevation signal generator comprising:

a flying spot scanner;

a factored storage member having coded elevation information stored thereon in the form of a plurality of adjacent gray level areas disposed to be traversed by a spot of light from said scanner, each gray level being one of first, second, and third predetermined gray levels, and each gray level area being representative of a predetermined incremental change of elevation in simulated terrain;

photomultiplier means disposed to receive scanner light transmitted thereto from said storage means, said photomultiplier means providing voltage output corresponding to light transmitted from said first, second, and third gray levels, said voltage output increasing by an amount $\Delta V$ when said spot scans from said first to said third gray levels, said voltage output decreasing by an amount $\Delta V$ when said spot scans from said third to said first gray level, said voltage output increasing by an amount $\Delta V/2$ when said spot scans from said first to said second gray level or from said second to said third gray level, and said voltage output decreasing by an amount $\Delta V/2$ when said spot scans from said third to said second gray level or said second to said first gray level; and logic means responsive to said increasing and decreasing of said photomultiplier means output to provide elevation signals corresponding to elevation of said simulated terrain.

2. In a radar landmass simulator, an elevation signal generator as defined in claim 1, and where said logic means comprises:

differentiator means connected to receive and differentiate said output of said photomultiplier means to provide positive trigger pulses proportional to said increasing voltage outputs and negative trigger pulses proportional to said decreasing voltage outputs;

a Schmitt trigger bank responsive to said trigger pulses to provide output signal pulses on a plurality of lines;

gating means responsive to said signal pulses from said Schmitt trigger bank to provide count-up and count-down pulses corresponding to incremental increases and decreases, respectively, in said terrain;

up/down digital counter means responsive to said up-pulses and down-pulses to algebraically add and subtract increments of elevation from a count digitally representing the elevation of said terrain; and digital to analog converter means responsive to said count to provide an analog signal representative of said terrain.

3. In a radar landmass simulator, an elevation generator as defined in claim 2 and wherein said Schmitt trigger bank comprises:

first, second, third, and fourth Schmitt triggers;

said first Schmitt trigger having a threshold of response such that it fires only on positive trigger signals corresponding to $+V_T/2$ and $+V_T$;

said second Schmitt trigger having a threshold of response such that it fires only on positive trigger signals corresponding to $+V_T$;

said third Schmitt trigger having a threshold of response such that it fires only on negative trigger signals corresponding to $-V_T/2$ and $-V_T$;

said fourth Schmitt trigger having a threshold of response such that it fires only on negative trigger signals corresponding to $-V_T$; and each of said Schmitt triggers providing its output on a separate one of said plurality of lines.

4. In a radar landmass simulator, an elevation generator as defined in claim 3 and wherein said gate means comprises:

a first inhibition gate connected to said first and second Schmitt triggers to receive pulses therefrom as controlled signals and inhibition controlling signals respectively;

a second inhibition gate connected to said third and fourth Schmitt triggers to receive pulses therefrom as controlled singals and inhibition controlling signals respectively;

a first OR gate connected to receive signal pulses from said second inhibition gate and from said second Schmitt trigger, and operative to provide a first direction count pulse in response to a signal pulse from either of said second inhibition gate or said second Schmitt trigger; and a second OR gate connected to receive signal pulses from said first inhibition gate and from said fourth Schmitt trigger, and operative to provide a second direction count pulse in response to a signal pulse from either of said first inhibition gate or said fourth Schmitt trigger.

5. In a radar landmass simulator, an elevation generator as defined in claim 4 and wherein:

said factored storage means comprises a transparency wherein said first gray level provides the least light transmission, said third gray level provides the most light transmission, and said second gray level provides light transmission which is an average of the transmissions of said first and third gray levels.

References Cited
UNITED STATES PATENTS
3,028,684    4/1962    Khanna et al. _____ 35—10.4

RODNEY D. BENNETT, *Primary Examiner.*

T. H. TUBBESING, *Assistant Examiner.*